United States Patent [19]

Occelli

[11] Patent Number: 4,761,391

[45] Date of Patent: Aug. 2, 1988

[54] DELAMINATED CLAYS AND THEIR USE IN HYDROCARBON CONVERSION PROCESSES

[75] Inventor: Mario L. Occelli, Yorba Linda, Calif.

[73] Assignee: Union Oil Company of California, Los Angeles, Calif.

[21] Appl. No.: 880,313

[22] Filed: Jun. 30, 1986

[51] Int. Cl.$^4$ ............................................. B01J 21/16
[52] U.S. Cl. ....................................... 502/63; 502/84; 423/326; 423/327
[58] Field of Search ...................... 502/60, 63, 72, 84; 423/328, 331

[56] References Cited

U.S. PATENT DOCUMENTS

| | | | |
|---|---|---|---|
| 3,586,478 | 6/1971 | Neumann | 423/331 |
| 3,664,973 | 5/1972 | Jaffe | 502/63 |
| 3,676,367 | 7/1972 | Raible | 502/63 |
| 3,887,454 | 6/1975 | Hickson | 208/111 |
| 3,892,655 | 7/1975 | Hickson | 208/111 |
| 4,176,090 | 11/1979 | Vaughan et al. | 502/63 |
| 4,216,188 | 8/1980 | Shabrai et al. | 423/118 |
| 4,238,364 | 12/1980 | Shabtai | 502/65 |
| 4,248,739 | 2/1981 | Vaughan et al. | 502/63 |
| 4,271,043 | 6/1981 | Vaughan et al. | 502/84 |
| 4,367,163 | 1/1983 | Pinnavaia et al. | 252/80 |
| 4,436,832 | 3/1984 | Jacobs et al. | 502/84 |
| 4,507,399 | 3/1985 | Miller et al. | 502/63 |
| 4,510,257 | 4/1985 | Lewis et al. | 502/84 |
| 4,515,901 | 5/1985 | Elattar | 502/84 |
| 4,579,832 | 4/1986 | Shabtai et al. | 502/84 |
| 4,629,712 | 12/1986 | Pinnavaia et al. | 502/63 |
| 4,637,991 | 1/1987 | Battiste et al. | 502/68 |
| 4,637,992 | 1/1987 | Lewis et al. | 502/84 |
| 4,640,764 | 2/1987 | Hamilton, Jr. | 208/110 |
| 4,661,464 | 4/1987 | Atkins | 502/84 |
| 4,665,044 | 5/1987 | Pinnavaia et al. | 502/84 |
| 4,665,045 | 5/1987 | Pinnavaia et al. | 502/84 |
| 4,666,877 | 5/1987 | Vaughan | 502/84 |

FOREIGN PATENT DOCUMENTS

| | | | |
|---|---|---|---|
| 2090766 | 7/1982 | United Kingdom | 502/84 |
| 2091120 | 7/1982 | United Kingdom | 502/84 |

OTHER PUBLICATIONS

M. L. Occelli, "New Routes to the Preparation of Pillared Montmorillonite Catalysts", *Journal of Molecular Catalysis*, vol. 35, 1986, pp. 377–389.

M. L. Occelli, S. D. Landau and T. J. Pinnavaia, "Cracking Selectivity to a Delaminated Clay Catalyst", *Journal of Catalysis*, vol. 90, 1984, pp. 256–260.

T. J. Pinnavaia, M. S. Tzou, S. D. Landau and R. H. Raythatha, "On the Pillaring and Delamination of Smectite Clay Catalysts by Polyoxo Cations of Aluminum", *Journal of Molecular Catalysis*, vol. 27, 1984, pp. 195–212.

T. J. Pinnavaia, "Preparation and Properties of Pillared and Delaminated Clay Catalysis", *Heterogeneous Catalysis*, B. L. Shapiro editor, Texas A&M University Press, College Station, Tex., 1984, pp. 142–164.

T. J. Pinnavaia, "Intercalated Clay Catalysts", *Science*, vol. 220, No. 4595, Apr. 1983, pp. 365–371.

*Primary Examiner*—Anthony McFarlane
*Attorney, Agent, or Firm*—Yale S. Finkle; Gregory F. Wirzbicki; Dean Sandford

[57] ABSTRACT

Delaminated clays whose X-ray diffraction patterns do not contain a distinct first order reflection are prepared from synthetic and natural swelling clays whose particles have a length-to-width rati greater than about 2.0, a length-to-thickness ratio greater than about 5.0 and are comprised of randomly oriented platelets by reacting the clay with a pillaring agent selected from the group consisting of polyoxymetal cations, mixtures of polyoxymetal cations, colloidal particles comprising alumina, silica, titania, chromia, tin oxide, antimony oxide or mixtures thereof, and cationic metal clusters comprising nickel, molybdenum, cobalt or tungsten and the subjecting the resulting reaction products to drying in a gaseous medium, preferably spray drying. The resulting acidic delaminated clays, which contain the microporosity associated with zeolites and pillared clays the the macroporosity associated with amorphous aluminosilicates, may be used as the active component of cracking and hydroprocessing catalysts.

34 Claims, 5 Drawing Sheets

DELAMINATED CLAYS AND THEIR USE IN HYDROCARBON CONVERSION PROCESSES

BACKGROUND OF THE INVENTION

This invention relates to clays and is particularly concerned with delaminated clays which contain both micropores and macropores and can be used as a constituent of various types of hydrocarbon conversion catalysts.

Smectite clays are a well known class of naturally occurring and synthetic layered clays which swell or expand when exposed to moisture. The particles of the swelling clays are composed of platelets stacked one on top another to form aggregates in which alkali metal and alkaline earth metal cations are interposed between the platelets. Each platelet can be visualized as a sandwich with the two outer layers composed primarily of silicon in tetrahedral coordination and the inner layer of a different element depending on the actual species of smectite clay. For example, the inner layer of a platelet in a montmorillonite clay is composed of aluminum in octahedral coordination, whereas in a hectorite clay the octahedral sites in the inner layer are occupied by magnesium and lithium. The stacked arrangement of platelets normally has a repeating structure about every 9 Angstroms. Besides montmorillonite and hectorite mentioned above, other types of smectite clays include beidellite, nontronite, and saponite. Smectite clays are discussed in detail in the book entitled *Clay Mineralogy*, second edition, authored by Ralph E. Grim and published by the McGraw-Hill Book Company in 1968, the disclosure of which book is hereby incorporated by reference in its entirety.

It is known that the platelets which comprise a swelling smectite clay can be separated by as much as 6 to 10 Angstroms by intercalating thermally stable, robust, three dimensional cations between the platelets of the clay. Clays modified in this manner are referred to as pillared clays or cross-linked smectites. The size, shape and nature of the intercalated cations allow them to impart acidity to the clay while serving as pillars to prop apart the layers of the clay, thereby exposing the surface of the layers for catalytic reactions. The fairly homogeneous distribution of pillars in the interlayered spaces of the clay form an array of rectangular openings, typically about 8 by 15 Angstroms in size, which enable the pillared clay to behave like a two dimensional sieve. By adjusting the size of the intercalated cations or the spacing between such cations or both, the pore size of the pillared clay may be adjusted to suit a particular application.

Pillared clays are typically prepared by reacting a smectite clay, such as montmorillonite, with polyoxymetal cations such as polyoxycations of aluminum and zirconium. The reaction product is normally dried in air and calcined to convert the intercalated cations into metal oxide clusters interposed between the platelets of the clay such that the spacing between the platelets ranges from about 6 to about 10 Angstroms and is maintained at such values when the clay is heated to a temperature between about 500° C. and 700° C. When the reaction product is dried, the clay platelets, which are propped apart by the metal oxide clusters, orient themselves face-to-face, thereby forming a lamellar structure which yields an X-ray diffraction pattern containing a distinct first order or (001) reflection. The extent of lamellar ordering is indicated by the X-ray powder diffraction pattern of the pillared clay. A well-ordered, air-dried, pillared montmorillonite may exhibit six or more orders of reflections whereas a freeze dried pillared montmorillonite may show only one or two orders of reflection. Pillared clays and their preparation are described more fully in the article entitled "Intercalated Clay Catalysts," *Science*, Vol. 220, No. 4595 pp. 365-371 (April 22, 1983) and in U.S. Pat. Nos. 4,367,163, 4,271,043, 4,248,739, 4,238,364, 4,216,188 and 4,176,090. The disclosures of the aforementioned article and patents are hereby incorporated by reference in their entireties.

The well-ordered stacking of platelets in natural and pillared montmorillonites can be directly observed with a transmission electron microscope (TEM). The resultant TEM micrographs show an extensive, long range, face-to-face platelet stacking in natural montmorillonite and indicate that this well-ordered orientation of platelets is retained after the clay has been reacted with polyoxyaluminum cations to form a pillared clay whose X-ray diffraction pattern contains a distinct first order reflection.

It has been reported in the literature that Laponite clay, a synthetic hectorite, can be reacted with polyoxyaluminum cations to form a flocculated reaction product which, when freeze dried, forms a clay whose platelets are unordered as compared to those of a pillared clay. In other words, in addition to containing platelets oriented face-to-face in an ordered, lamellar structure, the freeze dried clay product, which is known as a delaminated clay, also contains platelets which are oriented edge-to-edge and edge-to-face, thereby forming macropores of the type found in amorphous aluminosilicate supports. FIG. 1 contains schematic representations of a pillared clay and a delaminated clay which illustrate the different orientation of the platelets in these two types of clays. As can be seen, the pillared clay is a well ordered structure in which the clay platelets are propped apart by pillars or metal oxide clusters, represented by dark dots in the figure, and are substantially all oriented face-to-face in a stacked fashion. On the other hand, the schematic representation of the delaminated clay shows many platelets oriented edge-to-edge and edge-to-face, thereby generating a "house-of-cards" structure containing macropores of a size typically found in amorphous aluminosilicates in addition to the micropores found in pillared clays. Platelet aggregates having a "house-of-cards" structure are described by van Olphen in the book entitled *Clay Colloid Chemistry* published by Interscience Publishers in 1963, the disclosure of which book is hereby incorporated by reference in its entirety. The combination of macroporosity and microporosity found in delaminated clays leads to desirable catalytic properties that cannot be obtained with pillared clays alone.

Because of the rather random orientation of platelets in a delaminated clay, the X-ray diffraction pattern of such clays, unlike that of a pillared clay, will not contain a distinct first order or (001) reflection. An example of this can be seen in FIG. 2 which shows the X-ray diffraction pattern of a pillared montmorillonite prepared by air drying the flocculated product obtained by reacting montmorillonite with polyoxyaluminum cations. As can be seen, its X-ray diffraction pattern contains a first order reflection at a two-theta value of about 4.5 degrees. In contrast, the X-ray diffraction pattern of a delaminated Laponite clay prepared by freeze drying the flocculated reaction product obtained when Laponite B clay is reacted with polyoxyaluminum cations does not exhibit a first order reflection.

The preparation of delaminated clays by reacting Laponite clay with polyoxycations of aluminum and subsequently freeze drying the flocculated reaction product is discussed in the chapter entitled "Preparation and Properties of Pillared and Delaminated Clay Catalysts," authored by T. J. Pinnavaia and appearing in the book entitled *Heterogeneous Catalysis*, edited by B. L. Shapiro and published by the Texas A&M University Press, College Station, Tex., page 142 (1984) and in the article entitled "On the Pillaring and Delamination of Smectite Clay Catalysts by Polyoxo Cations of Aluminum," authored by T. J. Pinnavaia, M. S. Tzou, S. D. Landau, and R. H. Raythatha, and appearing at page 195 in the *Journal of Molecular Catalysis*, Vol. 27, (1984). The disclosures of these two publications are hereby incorporated by reference in their entireties. As pointed out in the latter mentioned article appearing in the *Journal of Molecular Catalysis*, delaminated clays having X-ray diffraction patterns with no distinct first order reflection have been prepared only by freeze drying the flocculated reaction product. Unfortunately, the use of freeze drying to prepare delaminated clays is very expensive in that it requires special equipment and long periods of time, typically as long as 15 days. Air drying of the flocculated reaction product, on the other hand, can be implemented in many existing catalyst plants in less than 24 hours. Obviously, it would be highly desirable to produce delaminated clays whose X-ray diffraction patterns contain no distinct first order reflection using an air drying step instead of freeze drying.

Accordingly, it is one of the objects of the present invention to provide a method for producing delaminated clays without the necessity of using a freeze drying step. It is another object of the invention to produce delaminated clays using polyoxymetal cations other than polyoxyaluminum cations. It is yet a further object of the invention to provide catalyst compositions containing such delaminated clays and hydrocarbon conversion processes utilizing such catalyst compositions. These and other objects of the invention will become more apparent in light of the following description of the invention.

SUMMARY OF THE INVENTION

In accordance with the invention, it has now been found that delaminated clays having an X-ray diffraction pattern which does not contain a first order or (001) reflection can be prepared by reacting swelling clays comprised of particles having a certain morphology or shape with a reactant to form a flocculated reaction product which is dried in a gaseous medium, preferably in the presence of air and typically at atmospheric pressure or above, instead of being freeze dried as taught in the prior art. In order to obtain a delaminated clay whose X-ray diffraction pattern contains no first order reflection utilizing such a drying step, the particles comprising the swelling clay reactant are normally comprised of randomly oriented platelets and are usually shaped such that their length-to-width ratio is greater than about 2.0 and their length-to-thickness ratio is greater than about 5.0. Typically, greater than about 20 percent of the clay particles have the above-described shape. The material with which the swelling clay is reacted to form the flocculated reaction product is selected from the group consisting of polyoxymetal cations, mixtures of polyoxymetal cations, colloidal particles comprising silica, alumina, titania, chromia, tin oxide, antimony oxide or mixtures thereof, and cationic metal clusters containing molybdenum, tungsten, nickel or cobalt.

In one embodiment of the invention, Laponite B clay is reacted with polyoxyaluminum cations, polyoxyzirconium cations, or mixtures of polyoxyaluminum and polyoxyzirconium cations to form a flocculated reaction product which is air dried, most preferably spray dried, to yield a delaminated clay product comprising a plurality of platelets propped apart with inorganic metal oxide clusters selected from the group consisting of zirconium oxide clusters, aluminum oxide clusters, and mixed zirconium and aluminum oxide clusters. Since the platelets in the air dried product are randomly oriented, the X-ray diffraction pattern of the delaminated clay contains no first order or (001) reflection.

The delaminated clays of the invention can be used alone or in combination with hydrogenation components as hydrocarbon conversion catalysts. Catalysts containing delaminated clays without a hydrogenation component have been found highly active for use in catalytic cracking processes while catalysts containing delaminated clays with added hydrogenation components are active for use in hydrocracking processes.

DETAILED DESCRIPTION OF THE INVENTION

Figure 1A:
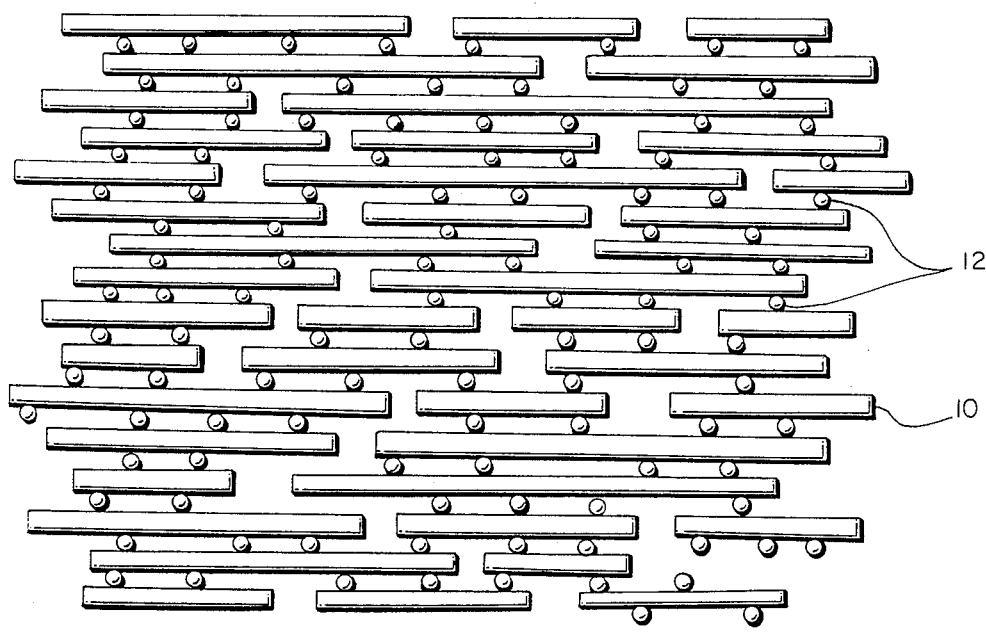
FIG. 1 in the drawing is a schematic representation illustrating the structures of a pillared clay and a delaminated clay.

The present invention relates to delaminated clays whose X-ray diffraction patterns do not contain a first order or (001) reflection, methods for producing such delaminated clays, catalysts containing such delaminated clays and processes for using catalysts which contain such delaminated clays. In accordance with the invention, the delaminated clays are prepared by reacting a swelling clay comprising a plurality of expandable platelets with a reactant or pillaring agent selected from the group consisting of polyoxymetal cations, mixtures of polyoxymetal cations, colloidal particles comprising silica, alumina, tin oxide, titania, chromia, antimony oxide or mixtures thereof, and cationic metal clusters comprising molybdenum, tungsten, nickel or cobalt to form a flocculated reaction product which is subsequently dried, preferably in the presence of air, to form a delaminated clay whose X-ray diffraction pattern does not contain a distinct first order reflection. In general, the swelling clay starting material is normally comprised of randomly oriented platelets aggregated into particles of which more than about 20 percent have a length-to-width ratio greater than about 2.0 and a length-to-thickness ratio greater than about 5.0.

In the past, delaminated clays having X-ray diffraction patterns which do not contain a first order reflection have been synthesized by reacting Laponite clay, a synthetic hectorite, with polyoxyaluminum cations and subsequently freeze drying the flocculated reaction product. The freeze drying step, however, requires expensive equipment and long times, thereby making a commercial process to produce such delaminated clays quite expensive. It has now been found that delaminated clays having X-ray diffraction patterns that do not contain a first order or (001) reflection, thereby indicating that the platelets of the clay are randomly oriented, can be prepared utilizing an air drying step in lieu of a freeze drying step if the starting swelling clay has certain morphological properties. Specifically, it has been found that if the platelets of the swelling clay are randomly aggregated through face-to-edge and edge-to-edge connections in addition to face-to-face connections to form particles shaped such that their length-to-width ratio is greater than about 2.0 and their length-to-thickness ratio is greater than about 5.0, the platelet aggregates, after the clay is reacted with the polyoxymetal cations or other pillaring agent to form the flocculated reaction product, will randomly orient themselves upon air drying to form a delaminated clay having a three dimensional, catalytically active structure containing micropores characteristic of zeolites and macropores characteristic of amorphous aluminosilicates. The micropores are formed by metal oxide clusters which prop apart the platelets of the clay, and the macropores are formed by the orientation of platelet aggregates in a random fashion so that the clay contains not only face-to-face platelet linkages but also face-to-edge and edge-to-edge platelet linkages. Because of the microporosity and macroporosity of these delaminated clays and the acidity introduced by the metal oxide clusters, the clays are able to serve as active components of various types of hydrocarbon conversion catalysts.

The swelling clays suitable for use as one of the reactants in producing the delaminated clays of the invention are expandable clays whose platelets are held together by weak van der Waal's forces and have a particular shape or morphology. It has been found that in order to produce delaminated clays whose X-ray diffraction patterns have no first order reflection by air drying, the particles of the starting clay material will typically have a length-to-width ratio greater than about 2.0, preferably greater than about 5.0, and a length-to-thickness ratio greater than about 5.0, preferably greater than about 7.0. In general, more than about 20 percent, preferably more than about 40 percent and most preferably more than about 50 percent, of the particles will have the above-discussed length-to-width and length-to-thickness ratios. In determining these ratios for odd shaped particles, the length is the straight line distance between the two points on the particles which are the furthest apart while the width is the straight line distance between the two points that are the closest together.

In addition to the above-discussed shape, it is most preferred that the particles of the starting clay comprise aggregates of randomly oriented platelets. In other words, the aggregates that form the particles of the clay should contain platelets oriented face-to-edge and edge-to-edge in addition to platelets oriented face-to-face, which is the main mode of platelet aggregation in montmorillonite. Examples of swelling clays which are not suitable for use as a starting material in preparing the delaminated clays of the invention because the platelets are well-ordered through face-to-face connections and the shape of the particles do not satisfy the above-discussed criteria are natural montmorillonites and natural hectorites. Naturally occurring montmorillonite and hectorite are composed of well-ordered, pancake-shaped platelets and such a shape favors face-to-face orientation of the platelet aggregates upon air drying of the flocculated reaction product, thereby forming a pillared clay whose X-ray diffraction pattern exhibits a distinct (001) or first order reflection.

A preferred swelling clay for use as one of the reactants in making the delaminated clays of the invention is Laponite B clay, a synthetic hectorite. Laponite B clay is a filter pressed, tray dried and pin milled product that normally contains between about 0.4 and about 0.8 weight percent soluble fluorine. The platelets of Laponite B clay are composed of two silica layers surrounding a layer of magnesium in octahedral coordination. Laponite B clay is manufactured and sold by Laporte Inorganics, a part of Laporte Industries Limited. A typical analysis and the physical properties of Laponite B clay are set forth below in Table 1.

TABLE 1

| Chemical Composition | |
|---|---|
| Component | Weight % |
| $SiO_2$ | 56.1 |
| $MgO$ | 26.6 |
| $Li_2O$ | 1.4 |
| $Na_2O$ | 3.6 |
| F | 5.6 |
| $H_2O$ (structural) | 6.0 |
| Physical Properties | |
| Appearance | white powder |
| True specific gravity | 2.53 |
| Apparent bulk density | 1.2 |
| Surface area ($N_2$ adsorption) | 370 $m^2/g$ |

In order to produce a flocculated reaction product which, upon air drying, will yield the delaminated clays of the invention, the starting clay reactant is mixed and reacted, usually in an aqueous medium, with polyoxymetal cations, mixtures of polyoxymetal cations, colloidal particles comprising silica, alumina, titania, tin oxide, chromia, antimony oxide or mixtures thereof, and cationic metal clusters comprising molybdenum, tungsten, nickel, or cobalt. The polyoxymetal cations suitable for use are sometimes referred to as polymeric cationic hydroxy metal complexes or as inorganic metal polymers and are formed by the hydrolysis of metal salts. Such complexes or polymers are described in detail in U.S. Pat. Nos. 4,176,090, 4,271,043 and 4,248,739.

Typically, it is preferred to utilize aqueous solutions of polyoxymetal cations selected from the group consisting of polyoxyaluminum cations, polyoxyzirconium cations, polyoxychromium cations and mixtures of such polyoxymetal cations as one of the reactants in producing the desired delaminated clays. The most preferred polyoxymetal cations for use as a reactant are the polyoxymetal cations of aluminum, zirconium or their mixtures. Specific types of polyoxyaluminum cations that may be used include cations having the empirical formula $[Al_{13}O_4(OH)_{24}(H_2O)_{12}]^{+7}$, which cations are found in solutions of aluminum chlorhydroxide, and polyoxyaluminum cations prepared by hydrolyzing an aqueous solution of aluminum chloride. A preferred polyoxyzirconium cation for use in making the delaminated clays of the invention has the empirical formula $[Zr_4(OH)_{14}(H_2O)_{10}]^{+2}$ and is found in solutions of zirconyl chlorhydroxide. Such solutions are prepared by dissolving zirconyl chloride in distilled water and then aging the resultant solution.

As mentioned earlier, mixtures of polyoxymetal cations can also be used as a reactant in preparation of the desired delaminated clays. A preferred mixture of polyoxymetal cations is a complex having the empirical formula $[ZrOCl_2.Al_8(OH)_{20}]^{+4}$ and known as zirconium-aluminum chlorhydroxide. A solution of zirconium-aluminum chlorhydroxide known as REZAL 67 is available from the Reheis Chemical Company.

In addition to the above-discussed polyoxymetal cations, colloidal particles containing alumina, silica, chromia, titania, tin oxide, antimony oxide or mixtures thereof may also be used as one of the reactants in preparing the delaminated clays of the invention. In general, any colloidal suspension of the desired particles can be used. An example of a colloidal suspension of alumina particles that may be reacted with an appropriate swelling clay to form a delaminated clay of the invention is NALCO ISJ-614, a colloidal suspension commercially available from the Nalco Chemical Company. Another colloidal suspension available from the Nalco Chemical Company which can be used in preparing the delaminated clays of the invention is known as NALCO ISJ-612. The particles in the latter suspension are alumina coated silica particles.

The cationic metal clusters suitable for use in preparing the delaminated clays of the invention include polynuclear metal halides containing molybdenum or tungsten. Examples of such halides include $Mo_6Cl_{12}$ and $W_6Cl_{12}$ and are prepared by reacting NaCl, $MoCl_5$ or $WCl_5$ and molybdenum or tungsten metal at a high temperature. The preparation and properties of these halides are described in detail in the article entitled "Convenient Synthesis of the Hexanuclear Molybdenum (II) Halides $Mo_6Cl_{12}$ and $Mo_6Br_{12}\cdot 2H_2O$" published in the *Inorganic Nuclear Chemistry Letters*, Vol. 16, pp. 307–310, (1980). The disclosure of this article is hereby incorporated by reference in its entirety. Other suitable cationic metal clusters contain nickel or cobalt and are prepared by aging solutions of nickel or cobalt nitrate.

To obtain the delaminated clays of the invention, a suspension of a swelling clay composed of particles having the proper morphology is mixed with a solution or suspension of the pillaring agent in amounts such that the weight ratio of the clay to the pillaring agent is between about 0.1 and about 10, preferably between about 1.0 and 2.0. The resulting mixture is agitated at a temperature between about 25° C. and about 100° C., preferably between about 40° C. and about 70° C., for a period of time ranging between about 0.5 hour and about 5 hours, preferably between about 1 hour and about 2 hours. As the reactants are mixed, the platelets of clay rapidly sorb the pillaring agent producing a flocculated mass comprised of randomly oriented pillared platelet aggregrates. The flocculated reaction product or gel is then separated from any remaining liquid by techniques such as centrifugation, filtration and the like. The gel is washed in warm water to remove excess reactants and the washed gel, which is preferably free of any impurities such as chloride anions, is dried in a substantially gaseous medium, preferably in the presence of air and typically at about atmospheric pressure or above, in an oven at a temperature ranging between about 50° C. and about 300° C., preferably between about 90° C. and 150° C. Most preferably, however, the washed gel is slurried in water and subjected to spray drying in accordance with techniques well known in the art. The particular pillaring agent used, after reaction to form the gel and upon heating, is converted into metal oxide clusters which prop apart the platelets of the clay and impart the acidity which is responsible for the catalytic activity of the resultant delaminated clay.

Figure 1B:
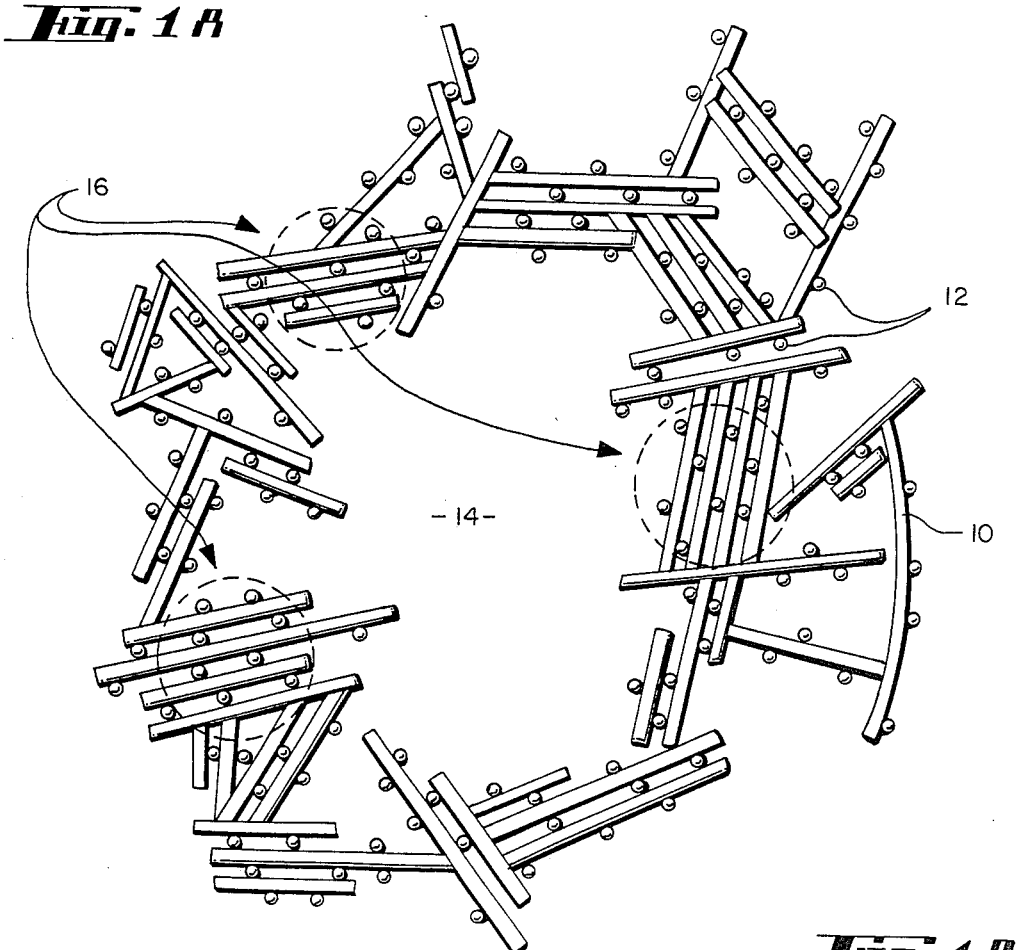
Figure 2:
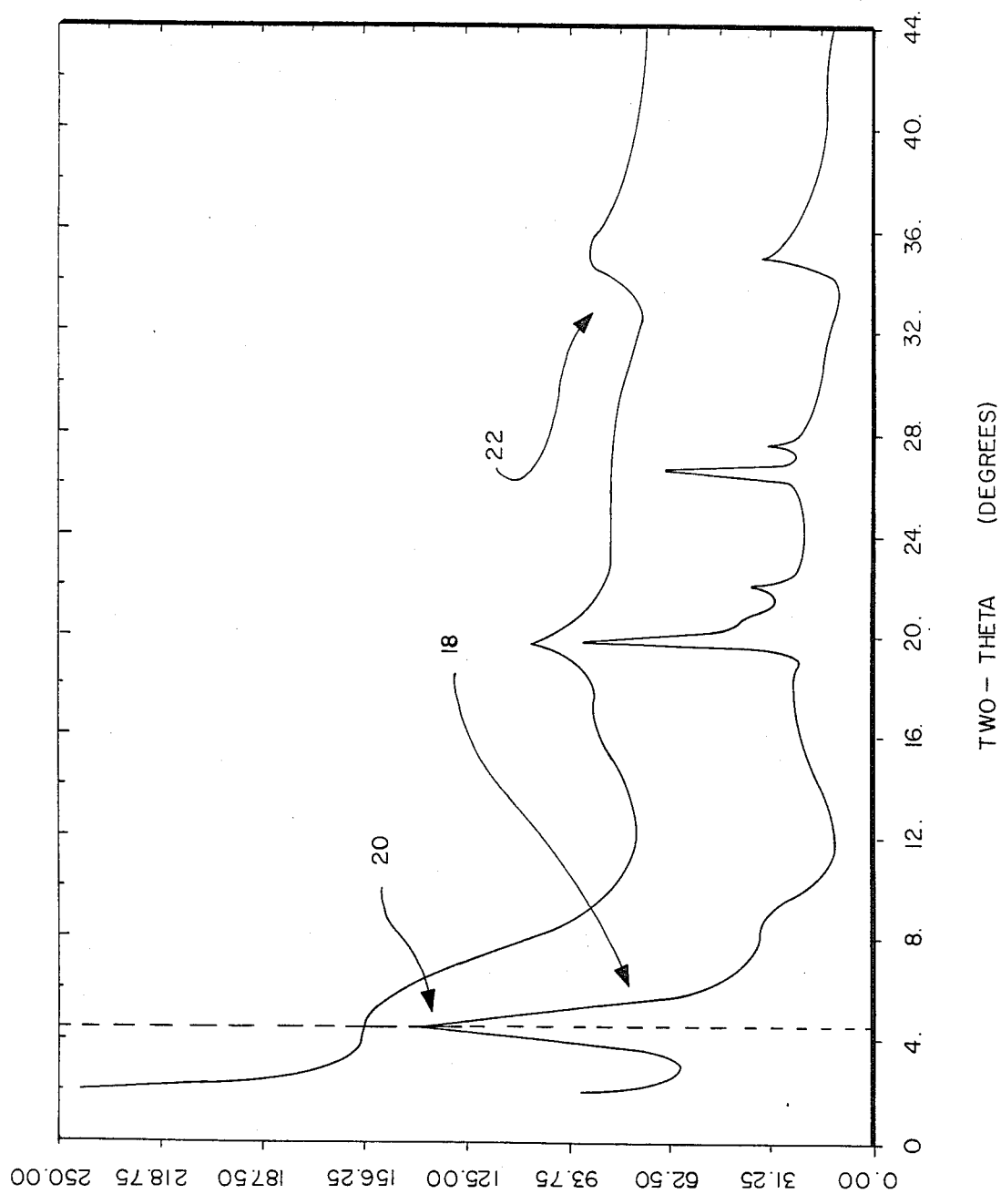
FIG. 2 shows a typical X-ray diffraction pattern for pillared montmorillonite, which contains a first order or (001) reflection, and the X-ray diffraction pattern for a delaminated Laponite clay prepared using freeze drying, which X-ray diffraction pattern does not contain a first order reflection.

The dried product is a delaminated clay composed of a plurality of platelets propped apart with inorganic metal oxide clusters to form catalytically active aggregates which are randomly oriented such that the X-ray diffraction pattern of the clay contains no distinct first order reflection. Because of the morphology of the swelling clay used as one of the initial reactants, air drying of the flocculated reaction product will produce a clay product in which the platelets are randomly oriented in the sense that, in addition to face-to-face linkages of platelets, there are also face-to-edge and edge-to-edge linkages forming a three dimensional catalytically active structure comprising micropores formed by the pillars between the platelets and macropores formed by the random orientation of the clay platelet aggregates. A schematic representation of a delaminated clay illustrating this random orientation of platelets is shown in FIG. 1.

The delaminated clays of the invention will normally have a surface area ranging between about 200 and about 500 m$^2$/gram and will be stable when heated in air to at least 500° C. A most important property of these clays is their acidity which is indicated by their capability of sorbing pyridine at room temperature and retaining greater than about 2.0 weight percent of the sorbed pyridine after being heated in a vacuum to a temperature greater than about 300° C. The micropore volume of the delaminated clays of the invention as measured by nitrogen adsorption usually ranges between about 0.1 and about 1.0 cc/gram, preferably between about 0.3 and about 0.8 cc/gram. The macropore volume as measured by mercury porosimetry typically ranges between about 0.1 and about 2.0 cc/gram, preferably between about 0.2 and about 0.9 cc/gram. In general, micropores will comprise between about 5 and about 70 percent of the pore volume of the delaminated clays of the invention while macropores will comprise between about 30 and about 95 percent of the pore volume.

The open macroporosity of the delaminated clays of the invention allows them to be used as adsorbents in a variety of applications. Moreover, since the delaminated clay products also contain a high degree of acidity along with their sorptive properties, these clays are ideally suited to be used as components of catalysts, particularly hydrocarbon conversion catalysts, and most preferably as components of cracking and hydrocracking catalysts. Since the clays contain macropores as well as micropores, large molecules that normally cannot enter the pores of zeolites will have access to the acid sites in the delaminated clays of the invention. Thus, the clays are more efficient in the cracking of higher molecular weight hydrocarbon constituents.

The delaminated clays of the invention may be used in the absence of added hydrogen as a catalyst for converting hydrocarbons to more valuable products by acid catalyzed reactions, such as catalytic cracking, isomerization of n-paraffins to isoparaffins, isomerization of alkyl aromatics, alkylation, and transalkylation of alkyl aromatics. The delaminated clays of the invention are especially suited for use in the cracking of hydrocarbon feedstocks. As used herein "hydrocarbon" refers to any compound which comprises hydrogen and carbon, and "hydrocarbon feedstock" refers to any charge stock which contains greater than about 90 weight percent carbon and hydrogen, calculated as the elements.

When used for catalytic cracking, the delaminated clays of the invention can be used alone or in combination with a zeolite and/or a porous, inorganic refractory oxide matrix. It is normally preferred to use the clay without additives as the cracking catalyst. However, when it is desired to include a zeolite and/or refractory oxide component as part of the catalyst, these components or precursors thereof are mixed with the clay to form a composite which is then subjected to spray drying to form the finished catalyst particles.

Suitable zeolites for inclusion in the cracking catalyst include any zeolite having cracking activity and a pore size above about 7.0 Angstroms. Normally, the pores of such a zeolite will be defined by 10 or 12-membered rings of oxygen atoms. Suitable zeolites include Y zeolites, ultrastable Y zeolites, X zeolites, zeolite beta, zeolite L, offretite, faujasite and zeolite omega. The preferred zeolites for use in the catalyst are X and Y zeolites with Y zeolites being the most preferred. The refractory oxide component in the finished catalyst may be silica-alumina, silica, alumina, natural or synthetic nonpillared clays or mixtures of one of more of these components and the like. A preferred composite finished cracking catalyst will typically contain between about 10 and about 90 weight percent delaminated clay, between about 5 and about 50 weight percent inorganic refractory oxide, and between about 5 and about 35 weight percent zeolite. The cracking catalyst will normally be comprised of particles ranging in diameter between about 40 and about 80 microns. Delaminated clays containing metal oxide clusters of tin or antimony are especially useful as components of cracking catalysts because they serve to reduce the deleterious effects of metal contaminants such as vanadium and nickel on cracking activity.

The hydrocarbon feedstocks that can be effectively cracked with the cracking catalysts of the invention include any hydrocarbon feedstock normally used in cyclic catalytic cracking processes to produce low boiling hydrocarbons. Examples of such feedstocks are vacuum gas oils, atmospheric gas oils, naphtha and the like. A typical feedstock will contain more than about 70 volume percent liquids boiling above about 650° F.

The delaminated clays of the invention can also be used alone or in combination with hydrogenation metal components as hydroconversion catalysts such as hydrocracking catalysts. The delaminated clays can be used alone as a hydroconversion catalyst if the metal oxide clusters that prop apart the platelets comprising the pillared aggregates of the clay contain a hydrogenation component such as a nickel or molybdenum component. If the delaminated clay itself does not contain such hydrogenation components, a hydroconversion catalyst may be prepared by mulling the clay with active metal hydrogenation precursors such as ammonium heptmolybdate, nickel nitrate, ammonium metatungstate, cobalt nitrate and the like. After mulling, the mixture is extruded through a die having openings of a cross sectional size and shape desired in the final catalyst particles. For example, the die may have circular openings to produce cylindrical extrudates, openings in the shape of three-leaf clovers so as to produce an extrudate material similar to that shown in FIGS. 8 and 8A of U.S. Pat. No. 4,028,227, the disclosure of which is hereby incorporated by reference in its entirety, or openings in the shape of four-leaf clovers. After extrusion, the extruded catalyst particles are broken in the lengths of from about 1/16 to ½ inch and subjected to air calcination.

Alternatively, hydrogenation components may be added to the delaminated clay by impregnation after the calcination step. The hydrogenation component or components may be impregnated into the calcined extrudates from a liquid solution containing the desired hydrogenation component or components in dissolved form. After the calcined clay extrudates have been impregnated with the solution containing the hydrogenation component or components, the particles are dried and calcined in air to produce the finished catalyst particles.

Hydrogenation components suitable for incorporation into the clay extrudates, either prior to or after extrusion, comprise metals selected from Group VIII or Group VIA of the Periodic Table of Elements. As used herein "Periodic Table of Elements" refers to the version officially approved by the International Union of Pure and Applied Chemistry (IUPAC) in its 1970 rules. An example of such a table may be found in the inside back cover of the book entitled "Advanced Inorganic Chemistry," fourth edition, which is authored by F. A. Cotton and G. Wilkinson and was published in 1980 by Wiley Interscience of New York. Examples of Group VIII and Group VIA metals that may be used include nickel, cobalt, tungsten, molybdenum, palladium and platinum. In some cases, it may be desirable that the delaminated clay be combined with at least one Group VIII metal component and at least one Group VIA metal component. When this is the case, the preferred combination will normally be a nickel and/or cobalt component with a molybdenum and/or tungsten component.

If the hydrogenation component consists essentially of a noble metal, the finished catalyst particles will typically contain between about 0.05 and about 10 weight percent of the hydrogenation component, preferably between about 0.10 weight percent and about 3.0 weight percent, calculated as the metal. If, on the other hand, the hydrogenation component consists essentially of a non-noble metal, it is normally desired that the finished catalyst particles contain between about 1.0 and about 40 weight percent of the hydrogenation component, preferably between about 10 and about 30 weight percent, calculated as the metal oxide.

In some cases it may be desired to add a zeolite having cracking activity to the hydroconversion catalyst containing the delaminated clay. The zeolite may be combined with the delaminated clay and hydrogenation component prior to mulling and extrusion or, if the hydrogenation component or components are added after extrusion, the zeolite and the delaminated clay may be mulled, extruded and then the hydrogenation component or components added by impregnation. Suitable zeolites for inclusion in the hydroconversion catalyst include any zeolite having cracking activity and a pore size above about 7.0 Angstroms. Normally, the pores of such a zeolite will be defined by 10 or 12-membered rings of oxygen atoms. Suitable zeolites include Y zeolites, ultrastable Y zeolites, X zeolites, zeolite beta, zeolite L, offretite, faujasite and zeolite omega. The preferred zeolites for use in the hydroconversion catalyst are X and Y zeolites with Y zeolites being the most preferred. When a zeolite is used in combination with the delaminated clay, the resultant support for the hydrogenation component or components will usually contain between about 5 and about 95 weight percent zeolite, preferably between about 40 and about 80 weight percent, and between about 5 and about 95 weight percent delaminated clay, preferably between about 20 and about 60 weight percent.

Hydroconversion catalysts containing delaminated clays prepared as described above may be used in a variety of hydroconversion processes such as hydrocracking, isomerization, reforming, hydrotreating and the like. Feedstocks that may be subjected to hydroconversion using such catalysts include mineral oils, synthetic oils such as shale oil, oil derived from tar sands, coal liquids and the like. Examples of appropriate feedstocks for hydroconversion include straight run gas oils, vacuum gas oils and catalytic cracker distillates. Preferred hydroconversion feedstocks include gas oils and other hydrocarbon fractions having at least 50 weight percent of their components boiling above about 700° F.

In general, the temperature at which the hydroconversion process takes place is between about 450° F. and about 850° F., preferably between about 600° F. and about 800° F. The pressure will normally range between about 750 and about 3500 psig, preferably between about 1000 and about 3000 psig. The liquid hourly space velocity (LHSV) is typically between about 0.3 and about 5.0, preferably between about 0.5 and about 3.0. The ratio of hydrogen gas to feedstock utilized will usually range between about 1000 and about 10,000 scf/bbl, preferably between about 2000 and about 8000 scf/bbl as measured at 60° F. and one atmosphere.

Catalysts as described above are particularly suited for cracking high molecular weight hydrocarbons because of the large macropores that comprise the delaminated clay used as a component of the catalyst. Relatively large size organic molecules, such as the molecules comprising aromatic compounds, which are normally too large to enter the micropores formed by the pillars or metal oxide clusters between the platelets of the clay, can penetrate the macropores of the delaminated clay where the acidity introduced by the metal oxide clusters causes the conversion to occur. In general, the micropores in the delaminated clay will substantially all be the same size, normally between about 5 and about 50 Angstroms, while the macropores will vary in size between about 100 and about 100,000 Angstroms.

The nature and objects of the invention are further illustrated by the following examples, which are provided for illustrative purposes only and not to limit the invention as defined by the claims. Examples 1 through 4 demonstrate that delaminated clays characterized by having X-ray diffraction patterns which do not contain a first order reflection can be prepared from certain types of swelling clays by reacting the clays with polyoxymetal cations and subsequently drying the resultant reaction product in air. Example 2 illustrates that such clays can be made by spray drying. Examples 5 through 8 show that delaminated clays can be prepared by reacting such swelling clays with certain types of colloidal particles. Example 9 demonstrates that the delaminated clays prepared in Examples 1 and 3 through 6 have activity for cracking reactions.

EXAMPLE 1

Figure 3:
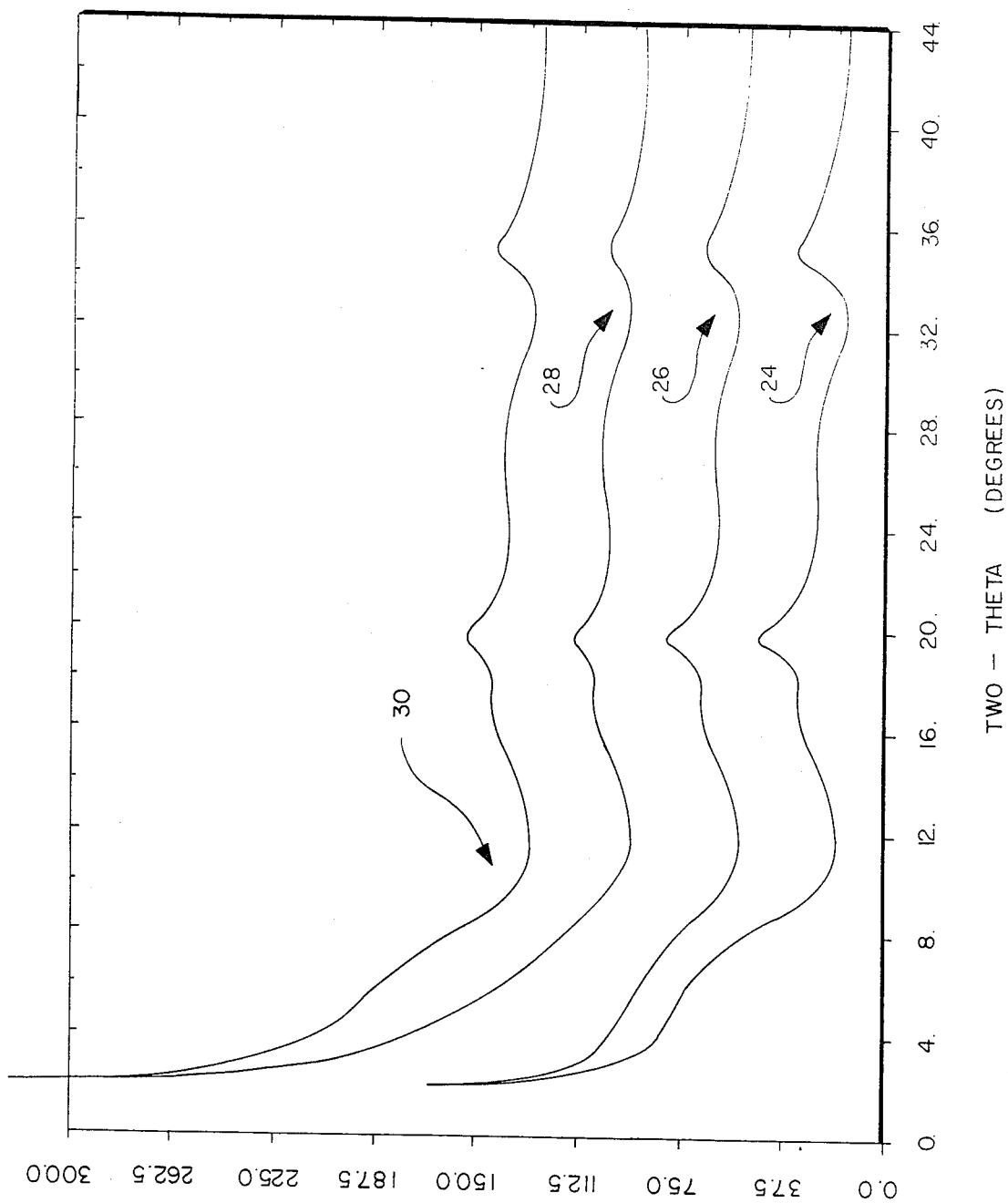
FIG. 3 depicts the X-ray diffraction patterns of the dry clay products synthesized in Examples 1 through 4.

Thirty grams of Laponite B clay is dispersed in 3 liters of deionized water and the resultant colloidal suspension is stirred overnight. The Laponite B clay has the composition shown in Table 2 below and is manufactured and sold by Laporte Inorganics, a division of Laporte Industries Limited. The temperature of the colloidal suspension is raised to about 60° C. after which time about 60 grams of an aluminum chlorhydroxide solution is added to the colloidal suspension to form a gel that is then stirred for about 1 hour. The aluminum chlorhydroxide solution utilized is Chlorhydrol solution manufactured and sold by the Reheis Chemical Company. After stirring, the gel is separated from any remaining liquid by centrifugation and repeatedly washed with deionized water to remove chloride anions. The washed gel is then oven dried in flowing air at 120° C. for 10 hours to produce a product that is crushed into granules of a size between 100 and 325 mesh on the U.S. Sieve Series Scale. X-ray diffractograms of the air dried product are obtained using a Siemens D-500 X-ray diffractometer with graphite-crystal monochromatized Cu-K alpha radiation. A resultant X-ray diffraction pattern is shown in FIG. 3. As can be seen, the diffraction pattern of the air dried product does not contain a first order or (001) reflection at a two-theta value between 4 and 5 degrees. The absence of such a reflection indicates that the platelets of the clay are randomly oriented rather than uniformly oriented face-to-face as is characteristic of air dried pillared clays. The delaminated clay product has a BET surface area of 420 m²/gram measured after drying in a vacuum at 400° C. for 4 hours, and a pore volume, measured by mercury porosimetry, of 0.59 cc/gram. The composition of the delaminated clay product is shown below in Table 2.

Figure 4:
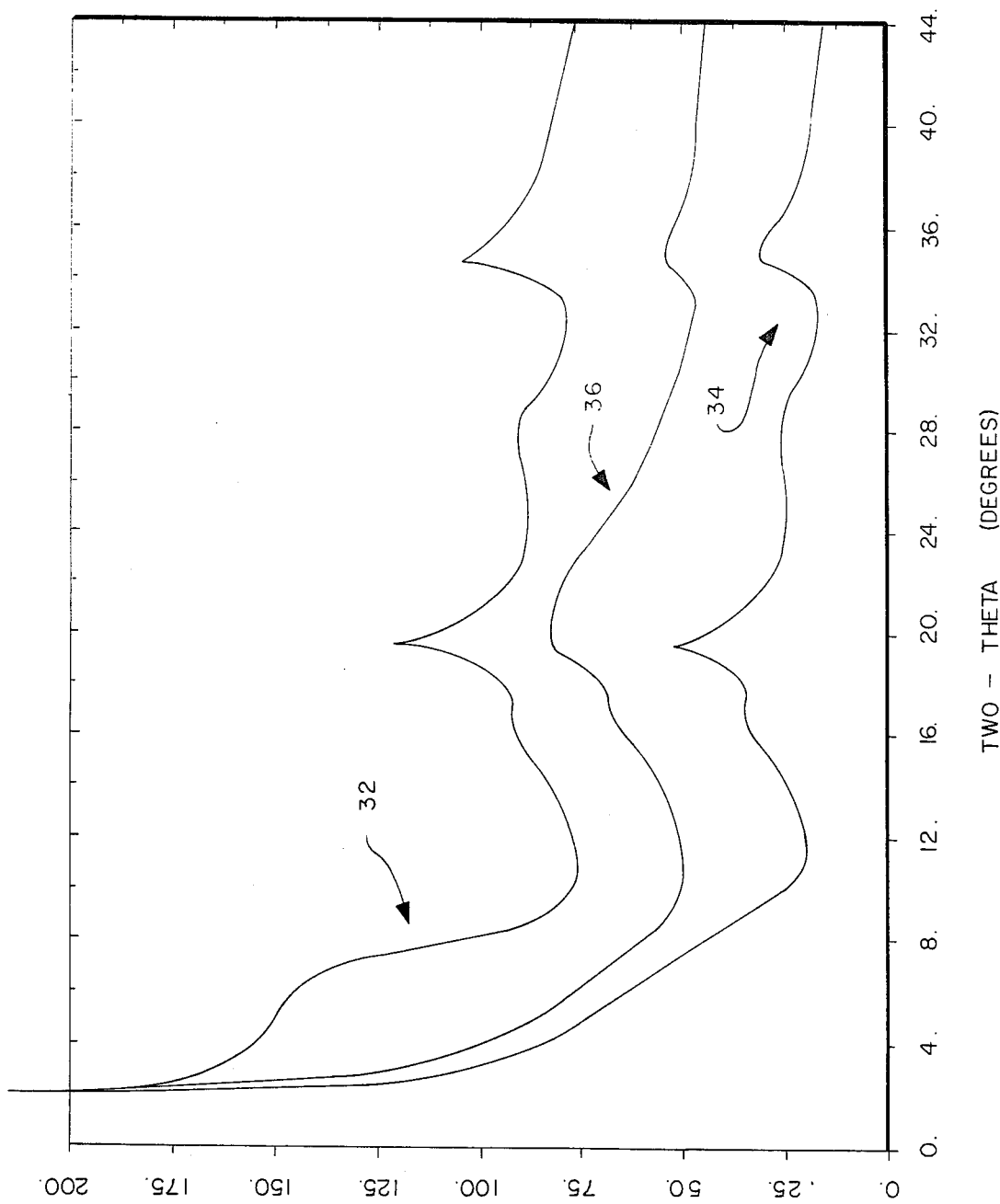
FIG. 4 sets forth the X-ray diffraction patterns of the dry clay products made in Examples 5 and 6, and the X-ray diffraction pattern of Laponite B clay.

The X-ray diffraction pattern for Laponite B clay, one of the initial reactants used in this example, is set forth in FIG. 4. As can be seen, it, like the clay product produced in the example, does not contain a first order reflection at a two-theta value between 4 and 5 degrees. The absence of a distinct first order reflection from the two X-ray diffraction patterns indicates that the clay platelets comprising the particles of the starting clay are randomly oriented and remain randomly oriented during conversion to the delaminated clay product.

TABLE 2

| Component | Laponite B Clay | Example 1 Clay Product | Example 3 Clay Product | Example 4 Clay Product |
|---|---|---|---|---|
| $SiO_2$ (wt. %) | 62.9 | 50.5 | 48.4 | 48.2 |
| $Al_2O_3$ (wt. %) | 0.3 | 24.4 | 0.08 | 10.7 |
| MgO (wt. %) | 28.7 | 20.4 | 16.6 | 20.8 |
| CaO (wt. %) | 0.027 | 0.003 | 0.19 | 0.03 |
| $Na_2O$ (wt. %) | 3.55 | 0.108 | 0.10 | 0.12 |
| $K_2O$ (wt. %) | 0.005 | 0.002 | 0.05 | 0.04 |
| $Li_2O$ (wt. %) | 0.75 | 0.56 | 0.45 | 0.54 |
| $Fe_2O_3$ (wt. %) | 0.02 | 0.026 | 0.40 | 0.36 |
| $ZrO_2$ (wt. %) | — | — | 31.60 | 11.94 |

EXAMPLE 2

Ten grams of the Laponite B clay used in Example 1 is dispersed in 2 liters of deionized water and the resultant colloidal suspension is stirred for 20 minutes. After stirring, 15 grams of Chlorhydrol solution is added to the suspension and the resulting gel is vigorously stirred for 30 minutes at 60° C. The gel is then washed with deionized water and subjected to spray drying in a Buchi 190 mini spray dryer. An X-ray diffractogram of the spray dried product is obtained as described in Example 1 and the resultant X-ray diffraction pattern is set forth in FIG. 3. As with the clay produced in Example 1, the X-ray diffraction pattern does not contain a first order reflection at a two-theta value between 4 and 5 degrees, thus indicating that the product clay is delaminated, i.e., is comprised of randomly oriented platelets. The spray dried clay product is calcined in flowing air at 500° C. for 24 hours. The BET surface area of the calcined clay is 343 m²/gram. This high surface area indicates that the clay is stable at high temperatures.

EXAMPLE 3

A zirconyl chlorhydroxide solution (a solution of polyoxyzirconium cations) is prepared by dissolving 30 grams of $ZrOCl_2.4H_2O$ in 400 ml of deionized water and allowing the resultant solution to age overnight. The aged zirconyl chlorhydroxide solution is then added to a colloidal suspension prepared by adding 30 grams of the Laponite B clay used in Example 1 to 3 liters of deionized water. The resultant gel is centrifuged to remove excess liquid and repeatedly washed with deionized water until it is chloride free. The washed gel is then oven dried in flowing air at 120° C. for 10 hours and crushed into particles ranging in size between 100 and 325 mesh on the U.S. Sieve Series Scale. An X-ray diffractogram of the resultant clay product is obtained as described in Example 1 and the resultant X-ray diffraction pattern is shown in FIG. 3. As can be seen, the X-ray diffraction pattern contains no first order reflection at a two-theta value between 4 and 5 degrees, thereby indicating that the air dried clay product is delaminated. The clay product has a BET surface area of 477 m²/gram measured after drying in a vacuum at 400° C. for 4 hours, and a pore volume, measured by mercury porosimetry, of 0.29 cc/gram. The composition of the clay is given in Table 2.

EXAMPLE 4

A solution of polyoxycations of alumina and zirconium is prepared by diluting 73 grams of REZAL 67 solution to 2 liters with deionized water. The REZAL 67 solution is manufactured and sold by the Reheis Chemical Company and has typical properties as shown in Table 3 below. The diluted solution of REZAL 67 is aged for 48 hours at 60° C. after which time 170 grams of the aged solution is added to a suspension formed by adding 30 grams of the Laponite B clay used in Example 1 to 3 liters of deionized water. The resultant gel is stirred vigorously for 1 hour at about 60° C. After stirring the gel is separated from any remaining liquid by centrifugation and then repeatedly washed with deionized water to remove chloride anions. The washed gel is oven dried in flowing air at 120° C. for 10 hours and the resultant dried product clay is crushed as described in Example 1. The X-ray diffraction pattern of the dry clay product is obtained as described in Example 1 and is set forth in FIG. 3. As can be seen, the X-ray diffraction pattern does not contain a first order reflection at a two-theta value between 4 and 5 degrees, thereby indicating that the clay is delaminated. The BET surface area of the product clay is 454 m²/gram measured after drying in a vacuum at 400° C. for 4 hours, and the pore volume, measured by mercury porosimetry, is 0.63 cc/gram. The composition of the clay is set forth in Table 2.

TABLE 3

| TYPICAL PROPERTIES OF REZAL-67 SOLUTIONS | |
|---|---|
| Solids Conc. (wt. %) | 40.0 |
| Al/Zr Ratio | 6.7 |
| Metals/Cl Ratio | 1.0 |
| Aluminum (wt. %) | 7.5–8.4 |
| Zirconium (wt. %) | 3.7–4.3 |
| Chloride (wt. %) | 6.5–7.2 |
| Iron (ppm) | $\leq 50$ |
| Heavy Metals (ppm Pb) | $\leq 10$ |

EXAMPLE 5

Thirty grams of the Laponite B clay used in Example 1 is dispersed in 3 liters of deionized water and the resulting colloidal suspension is mixed with 300 grams of NALCO IJS-614 dispersion, a colloidal suspension of alumina particles available from the Nalco Chemical Company. Typical properties of NALCO IJS-614 dispersions are set forth in Table 4 below. The resultant gel is stirred at about 60° C. for 1 hour then centrifuged, washed once, oven dried in flowing air at 120° C. for 10 hours and crushed into granules as described in Example 1. The resultant clay product has a BET surface area of 420 m²/gram measured after drying in a vacuum at 400° C. for 4 hours, and a pore volume, measured by mercury porosimetry, of 0.60 cc/gram. The X-ray diffraction pattern of the clay, obtained as described in Example 1, is set forth in FIG. 4 and has no first order reflection at a two-theta value between 4 and 5 degrees, thereby indicating that the clay is delaminated. The chemical composition of the clay is shown below in Table 5.

TABLE 4

| TYPICAL PROPERTIES OF CHARGED ALUMINA AND SILICA-ALUMINA COLLOIDAL SUSPENSIONS | | |
|---|---|---|
| | NALCO IJS-612 | NALCO IJS-614 |
| Alumina (wt. % as $Al_2O_3$) | 4.0 | 10.0 |
| Silica (wt. % as $SiO_2$) | 26.0 | — |
| Average Particle Size (pm) | 20.0 | 2.0 |
| Specific Gravity | 1.23 | 1.1 |
| pH | 4.2 | 5.1 |
| Viscosity (cps) | <15.0 | — |
| Chloride (wt. %) | <1.5 | — |
| Conductivity (pmhos) | 16,000 | <18,000 |

TABLE 5

| Component | Laponite B | Example 5 Clay Product | Example 6 Clay Product |
|---|---|---|---|
| $SiO_2$ (wt. %) | 62.9 | 37.0 | 78.8 |
| $Al_2O_3$ (wt. %) | 0.3 | 34.2 | 7.26 |
| MgO (wt. %) | 28.7 | 27.7 | 8.56 |
| CaO (wt. %) | 0.027 | 0.13 | 0.18 |
| $Na_2O$ (wt. %) | 3.55 | 0.22 | 0.16 |
| $K_2O$ (wt. %) | 0.005 | 0.03 | 0.006 |
| $Li_2O$ (wt. %) | 0.75 | 0.075 | 0.22 |
| $Fe_2O_3$ (wt. %) | 0.02 | 0.05 | 0.015 |

EXAMPLE 6

Thirty grams of the Laponite B clay used in Example 1 is suspended in 3 liters of deionized water and the resulting suspension is mixed with approximately 200 grams of NALCO IJS-612 dispersion, a colloidal suspension of silica particles coated with $Al^{+3}$ cations, which suspension is commercially available from the Nalco Chemical Company. The silica-to-alumina mole ratio of the NALCO IJS-612 dispersion is about 16. Typical properties of the dispersion are set forth in Table 4. The gel formed after the two suspensions are mixed is stirred at about 60° C. for 1 hour and then centrifuged, washed once, oven dried in flowing air at 120° C. for 10 hours and crushed as described in Example 1. The resultant clay product has a BET surface area of 243 $m^2$/gram measured after drying in a vacuum at 400° C. for 4 hours, and a pore volume, measured by mercury porosimetry, of 0.88 cc/gram. The X-ray diffraction pattern of the product clay, obtained as described in Example 1, is set forth in FIG. 4. The fact that the X-ray diffraction pattern does not contain a first order reflection at a two-theta value between 4 and 5 degrees indicates that the clay is delaminated. The composition of the clay product is set forth in Table 5.

EXAMPLE 7

Figure 5:
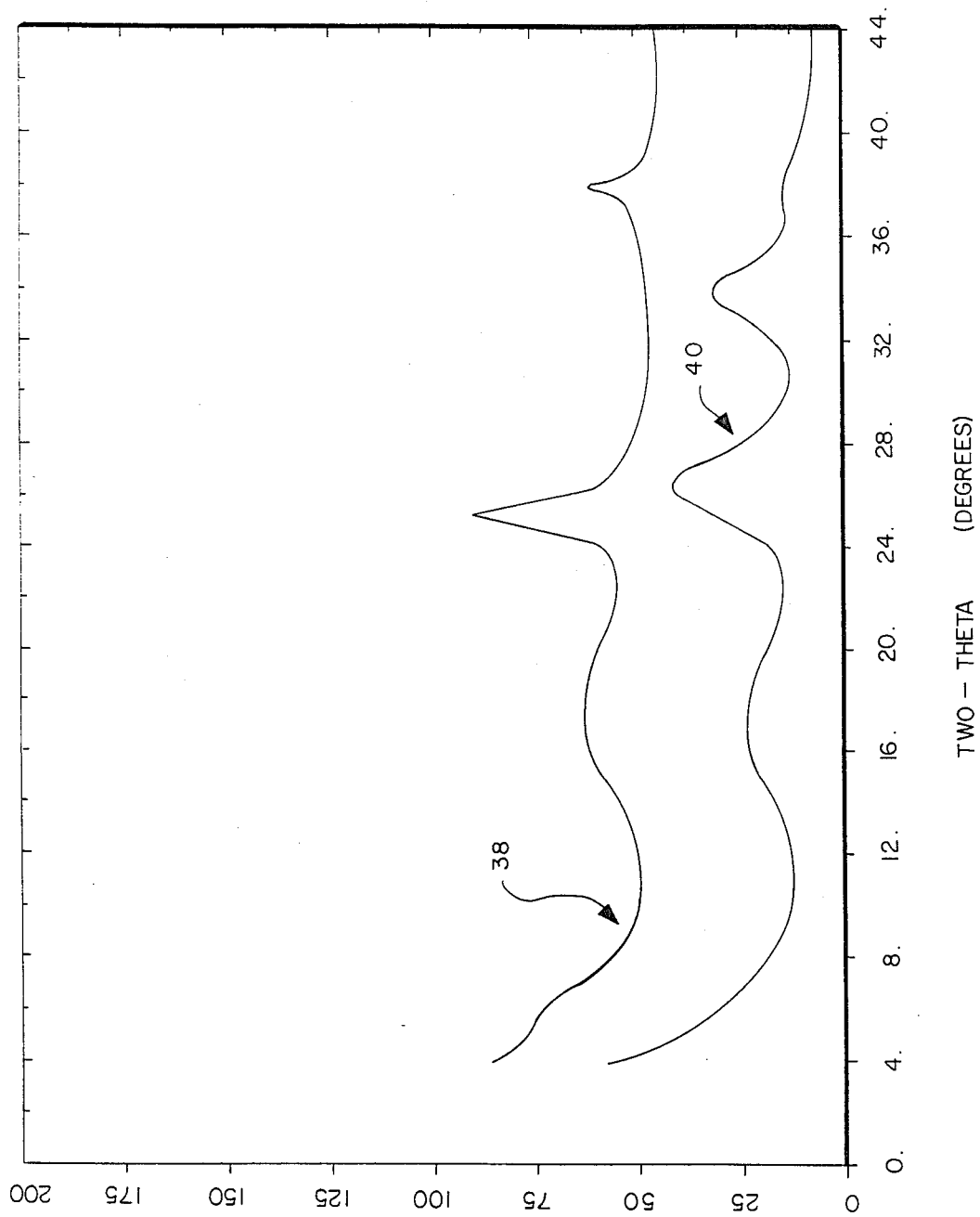
FIG. 5 depicts the X-ray diffraction patterns of the dry clay products synthesized in Examples 7 and 8.

Thirty grams of the Laponite B clay used in Example 1 is dispersed in 3 liters of deionized water and the resulting colloidal suspension is mixed with 300 grams of a colloidal suspension of titanium dioxide available from the Nalco Chemical Company and designated as NALCO TX 2588. The resultant gel is stirred at about 60° C. for 1 hour then centrifuged, washed once, oven dried in flowing air at 120° C. for 10 hours and crushed into granules as described in Example 1. The resultant clay product has a BET surface area of 262 $m^2$/gram measured after drying in a vacuum at 400° C. for 4 hours. The X-ray diffraction pattern of the clay, obtained as described in Example 1, is set forth in FIG. 5 and exhibits no first order reflection at a two-theta value between 4 and 5 degrees, thereby indicating that the clay is delaminated.

EXAMPLE 8

Thirty grams of the Laponite B clay used in Example 1 is dispersed in 3 liters of deionized water and the resulting colloidal suspension is mixed with 300 grams of a colloidal suspension of tin oxide particles available from the Nalco Chemical Company. The resultant gel is stirred at about 60° C. for 1 hour then centrifuged, washed once, oven dried in flowing air at 120° C. for 10 hours and crushed into granules as described in Example 1. The resultant clay product has a BET surface area of 318 $m^2$/gram measured after drying in a vacuum at 400° C. for 4 hours. The X-ray diffraction pattern of the clay, obtained as described in Example 1, is set forth in FIG. 5 and has no first order reflection at a two-theta value between 4 and 5 degrees, thereby indicating that the clay is delaminated.

EXAMPLE 9

The cracking activities and selectivities of the clay products made in Examples 1 and 3 through 6 are evaluated and compared with those of Laponite B clay using the standard microactivity test (MAT) method as discussed in detail in the article entitled "Microactivity Test For Cracking," authored by F. G. Ciapetta and D. Anderson and appearing in the *Oil and Gas Journal*, Vol. 65, p. 88 (1967), the disclosure of which article is hereby incorporated by reference in its entirety. Prior to subjecting the clay products to the MAT method, they are calcined in air at 500° C. for 10 hours. The feedstock utilized in the test has an API gravity of 30.4, and contains 0.31 weight percent total nitrogen, calculated as the element, and 0.01 weight percent basic nitrogen, calculated as the element. The MAT tests are carried out at atmospheric pressure and at a temperature of 950° F. utilizing a weight hourly space velocity of about 14, a catalyst-to-oil ratio of 3.6 and a contact time of 80 seconds. The results of these tests are set forth below in Table 6.

TABLE 6

| Clay | BET Surface Area ($m^2$/g) | Conversion (vol %) | Gasoline (vol %) | Light Cycle Oil (vol %) |
|---|---|---|---|---|
| Laponite B | 380 | 33.0 | 20.1 | 52.3 |
| Example 1 | 420 | 67.0 | 48.0 | 32.0 |
| Example 3 | 477 | 65.6 | 46.8 | 32.0 |
| Example 4 | 454 | 64.0 | 50.0 | 34.0 |
| Example 5 | 420 | 59.2 | 44.8 | 37.9 |
| Example 6 | 243 | 51.1 | 38.8 | 43.1 |

As can be seen from the data in Table 6, the delaminated clays of Examples 1, 3 and 4, which were prepared by reacting Laponite B clay with polyoxymetal cations, have substantially greater activity than the Laponite B clay itself. The conversion obtained with the high surface area Laponite B clay was only 33.0 volume percent because the clay contained no acidity. The conversions obtained with the clays of Examples 1, 3 and 4, which are acidic due to the incorporated metal oxide clusters, however, ranged between 64.0 and 67.0 volume percent, an increase in conversion which represents more than a four fold increase in activity. Also, the gasoline production obtained with the Laponite B clay was less than half that of the delaminated clays of Examples 1, 3 and 4. As can be seen from the data, the gasoline production for Laponite B clay was 20.1 volume percent whereas the gasoline production obtained with the delaminated clays of Examples 1, 3 and 4 ranged between 46.8 and 50.0 volume percent. Although the delaminated clays produced in Examples 5 and 6 by reacting Laponite B clay with colloidal particles of alumina and silica-alumina, respectively, are not as active as the delaminated clays of Examples 1, 3 and 4, they still have substantial activity compared to Laponite B clay and yield about twice the gasoline production.

It will be apparent from the foregoing that the invention provides a method for producing delaminated clays whose platelets are propped apart with inorganic metal oxide clusters by reacting clays, such as Laponite B clay, whose platelets have certain shapes with polyoxymetal cations and other types of pillaring agents to produce a flocculated reaction product which is subsequently air dried. The resultant clay products contain the microporosity associated with pillared clays and the macroporosity associated with inorganic refractory oxide supports and are useful in a wide range of hydrocarbon conversion processes such as catalytic cracking and hydroprocessing.

Although this invention has been primarily described in conjunction with examples and by reference to embodiments thereof, it is evident that many alternatives, modifications and variations will be apparent to those skilled in the art in light of the foregoing description.

Accordingly, it is intended to embrace within the invention all such alternatives, modifications and variations that fall within the spirit and scope of the appended claims.

I claim:

1. A process for preapring a delaminated clay having an X-ray diffraction pattern which does not contain a first order reflection, which process comprises:
   (a) reacting a natural or synthetic swelling clay with a reactant selected from the group consisting of colloidal silica particles, colloidal alumina particles, colloidal titania particles, colloidal chromia particles, colloidal tin oxide particles, colodial antimony oxide particles, cationic molybdenum clusters, cationic tungsten clusters, cationic nickel clusters, cationic cobalt clusters and mixtures thereof to form a flocculated reaction product, said swelling clay being comprised of particles at least about 20 percent of which have a length-to-width ratio greater than about 2.0 and a length-to-thickness ratio greater than about 5.0 and wherein said particles are comprised of platelets; and
   (b) drying said floccculated reaction product in the presence of air to form said delaminated clay having an X-ray diffraction pattern which does not contain a first order reflection.

2. A process as defined by claim 1 wherein said natural or synthetic swelling clay comprises Laponite. B clay.

3. A process as defined by claim 1 wherein greater than about 50 percent of the particles comprising said swelling clay have a length-to-width ratio greater than about 5.0 and a length-to-thickness ratio greater than about 7.0.

4. A process as defined by claim 1 wherein said platelets comprising the particles of said swelling clay are randomly oriented.

5. A process as defined by claim 1 wherein said flocculated reaction product is spray dried.

6. A process as defined by claim 1 wherein said flocculated reaction product is oven dried.

7. A process as defined by claim 1 wherein said reactant is selected from the group consisting of colloidal silica particles, colloidal alumina particles, colloidal titania particles, coloidal chromia particles, colloidal tin oxide particles, colloidal antimony oxide particles and mixtures thereof.

8. A process as defined by claim 1 wherein said reactant is selected from the group consisting of cationic molybdenum clusters, cationic tungsten clusters, cationic nickel clusters, cationic cobalt clusters and mixtures thereof.

9. A catalyst composition comprising a delaminated clay prepared in accordance with the process of claim 1.

10. A catalyst composition comprising a delaminated clay prepared in accordnace with the process of claim 5.

11. A process for preparing a delaminated clay having an X-ray diffraction pattern which does not contain a first order reflection, which process comprises:
    (a) reacting Laponite B clay with a reactant selected from the group consisting of colloidal silica particles, coloidal alumina particles, colloidal titania particles, and colloidal tin oxide particles to form a flocculated reaction product; and
    (b) drying said flocculated reaction product in the presence of a gaseous medium to form said delaminated clay having an X-ray diffraction pattern which does not contain a first order reflection.

12. A process as defined by claim 11 wherein said gaseous medium comprises air.

13. A catalyst composition comprising a delaminated clay prepared in accordance with the process of claim 11.

14. A delaminated clay having an X-ray diffraction pattern which does not contain a first order reflection produced by the process comprising:
    (a) reacting a natural or synthetic swelling clay with a reactant selected from the group consisting of colloidal silica particles, colloidal tin oxide particles, colloidal antimony oxide particles, cationic molybdenum clusters, cationic tungsten clusters, cationic nickel clusters, cationic cobalt clusters and mixtures thereof to form a flocculated reaction product, said swelling clay being comprised of particles at least 20 percent of which have a length-to-width ratio greater than about 2.0 and a length-to-thickness ratio greater than about 5.0 and wherein said particles are comprised of platelets; and
    (b) drying said flocculated reaction product in the presence of a gaseous medium to form said delaminated clay having an X-ray diffraction pattern which does not contain a first order reflection.

15. A delaminated clay as defined by claim 14 wherein said gaseous medium comprises air.

16. A delaminated clay as defined by claim 15 wherein said natural or synthetic clay comprises Laponite B clay.

17. A delaminated clay as defined by claim 15 wherein said platelets comprising the particles of said natural or synthetic swelling clay are randomly oriented.

18. A delaminated clay as defined by claim 15 wherein said reactant is selected from the group consisting of colloidal silica particles and colloidal tin oxide particles.

19. A delaminated clay as defined by claim 18 wherein said flocculated reaction product is spray-dried.

20. A catalyst composition comprising the delaminated clay of claim 14.

21. A catalyst composition comprising the delaminated clay of claim 15.

22. A delaminated clay as defined by claim 18 wherein said natural or synthetic swelling clay comprises Laponite B clay.

23. A catalyst composition comprising the delaminated clay of claim 22.

24. A delaminated clay having an X-ray diffraction pattern which does not contain a first order reflection produced by the process comprising:
    (a) reacting a natural or synthetic swelling clay whose particles are composed of randomly oriented platelets with a reactant selected from the group consisting of colloidal silica particles, colloidal tin oxide particles, colloidal antimony oxide particles, cationic molybdenum clusters, cationic tungsten clusters, cationic nickel clusters, cationic cobalt clusters and mixtures thereof to form a flocculated reaction product; and
    (b) drying said flocculated reaction product in the presence of a gaseous medium to form said delaminated clay having an X-ray diffraction pattern which does not contain a first order reflection.

25. A delaminated clay as defined by claim 24 wherein said gaseous medium comprises air.

26. A delaminated clay as defined by claim 25 wherein greater than about 40 percent of the particles comprising said clay have a length-to-width ratio greater than about 2.0 and a length-to-thickness ratio greater than about 5.0.

27. A delaminated clay as defined by claim 25 wherein said reactant is selected from the group consisting of colloidal silica particles and colloidal tin oxide particles.

28. A catalyst composition comprising the delaminated clay of claim 24.

29. A catlayst composition comprising the delaminated clay of claim 25.

30. A delaminated clay containing both micropores and macropores comprising a plurality of platelets propped apart with inorganic metal oxide clusters to form platelet aggregates containing said micropores, said inorganic metal clusters selected from the group consisting of mixed zirconium and aluminum oxide clusters, silicon oxide clusters, mixed silicon and aluminum oxide clusters, nickel oxide clusters, cobalt oxide clusters, molybdenum oxide clusters, tungsten oxide clusters, tin oxide clusters and antimony oxide clusters, and wherein said platelet aggregates are randomly oriented to form said macropores such that the X-ray diffraction pattern of said clay does not contain a first order reflection.

31. A delaminated clay as defined by claim 30 wherein said micropores comprise between about 5 and about 70 percent of the pore volume of said clay and said macropores comprise between about 30 and about 95 percent of said pore volume.

32. A delaminated clay as defined by claim 30 wherein said inorganic metal clusters are selected from the group consisting of mixed zirconium and aluminum oxide clusters, mixed silicon and aluminum oxide clusters, and tin oxide clusters.

33. A catalyst composition comprising the delaminated clay of claim 30.

34. A catalyst composition comprising the delaminated clay of claim 32.

* * * * *